US006508229B2

(12) United States Patent
Miyakubo et al.

(10) Patent No.: US 6,508,229 B2
(45) Date of Patent: Jan. 21, 2003

(54) AUTO-IGNITION COMBUSTION MANAGEMENT IN INTERNAL COMBUSTION ENGINE

(75) Inventors: Hiroshi Miyakubo, Kanagawa (JP); Akihiro Iiyama, Kanagawa (JP); Tsuyoshi Taniyama, Kanagawa (JP); Koudai Yoshizawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 30 days.

(21) Appl. No.: 09/875,156

(22) Filed: Jun. 7, 2001

(65) Prior Publication Data

US 2001/0052335 A1 Dec. 20, 2001

(30) Foreign Application Priority Data

Jun. 15, 2000 (JP) ........................................ 2000-179581

(51) Int. Cl.[7] ................................ F02B 9/02; F02B 3/08
(52) U.S. Cl. ...................................... 123/305; 123/90.15
(58) Field of Search ............................... 123/305, 90.15

(56) References Cited

U.S. PATENT DOCUMENTS

| 4,397,270 | A |   | 8/1983  | Aoyama ................ 123/90.16 |
|-----------|---|---|---------|----------------------------------|
| 5,669,343 | A |   | 9/1997  | Adachi ................... 123/90.17 |
| 5,785,016 | A |   | 7/1998  | Enderle et al. ........... 123/90.11 |
| 5,836,276 | A |   | 11/1998 | Iwasaki et al. .......... 123/90.17 |
| 5,988,125 | A |   | 11/1999 | Hara et al. .............. 123/90.16 |
| 6,006,720 | A | * | 12/1999 | Yanagihara et al. ........ 123/305 |
| 6,267,097 | B1 | * | 7/2001  | Urushihara et al. ...... 123/90.15 |
| 6,293,246 | B1 | * | 9/2001  | Tanahashi et al. .......... 123/305 |
| 6,354,264 | B1 | * | 3/2002  | Iwakiri et al. ............... 123/305 |
| 6,422,200 | B1 | * | 7/2002  | Morikawa et al. .......... 123/305 |
| 6,425,367 | B1 | * | 7/2002  | Hiraya et al. ............. 123/90.15 |

FOREIGN PATENT DOCUMENTS

| JP | 7-004287   | 1/1995  |
| JP | 10-196424  | 7/1998  |
| JP | 11-210539  | 8/1999  |
| JP | 11-294125  | 10/1999 |
| JP | 2000-73797 | 3/2000  |

OTHER PUBLICATIONS

Pieriik et al., A Low–Friction Variable–Valve–Actuation Device, Part I: Mechanism Description and Friction Measurements, SAE Paper 970338, pp. 81–87.

* cited by examiner

*Primary Examiner*—Erick Solis
(74) *Attorney, Agent, or Firm*—Foley & Lardner

(57) ABSTRACT

An internal combustion engine is operated on auto-ignition combustion of fuel with low cetane number like gasoline. The engine has at least one cylinder and a reciprocating piston in the cylinder to define a combustion chamber. Combustion event in the cylinder is expressed in terms of two variables. They are main combustion timing ($\theta 50$) and a main combustion period ($\theta 20\text{-}50$). The main combustion timing ($\theta 50$) represents a crank position when mass burnt rate is 50 percent. The main combustion period ($\theta 20\text{-}50$) represents a period from a crank position when mass burnt is 20 percent to a crank position when mass burnt is 50 percent. Controlled parameters governing main combustion are varied to adjust the main combustion timing on an advance side of a retard limit ($\theta 50$ max) and to adjust the main combustion period within a range between an upper limit ($\theta 20\text{-}50$ max) and a lower limit ($\theta 20\text{-}50$ min).

20 Claims, 7 Drawing Sheets

AUTO-IGNITION COMBUSTION MANAGEMENT IN INTERNAL COMBUSTION ENGINE

FIELD OF THE INVENTION

The present invention relates to an internal combustion engine, which can be operated on auto-ignition combustion of fuel with low cetane number like gasoline, and more particularly to a system and method for auto-ignition combustion management in an internal combustion engine.

DESCRIPTION OF RELATED ART

When certain conditions are met within a charge of lean air/fuel mixture during low load operation, auto-ignition can occur wherein bulk combustion takes place initiated simultaneously from many ignition sites within the charge, resulting in very stable power output, very clean combustion and high thermal efficiency. NOx emission produced in controlled auto-ignition combustion is extremely low. In controlled auto-ignition combustion where the combustion is uniformly distributed throughout the charge from many ignition sites, the burnt gas temperature is substantially homogeneous with much lower local temperature values resulting in very low NOx emission.

Auto-ignition combustion at low speeds with low or middle load and spark-ignition combustion at high speeds with high or full load result in enhanced fuel consumption rate and reduced NOx emission at low speeds with low or middle load and high power output at high speeds with high or full load.

JP-A 10-196424 discloses an auto-ignition internal combustion engine. According to this known engine, each cylinder has a control piston in addition to a reciprocating piston. Time of auto-ignition of air/fuel mixture is governed by the control piston, which provides additional compression around top dead center of reciprocating piston. With this additional compression, the air/fuel mixture can be elevated in temperature high enough for auto-ignition.

JP-A 11-210539 discloses a spark assist type auto-ignition internal combustion engine. According to this known engine, an open time of intake valve is adjusted to vary amount of burnt gas to be drawn during induction stroke of piston, thereby to vary temperature of gas within a combustion chamber. A temperature sensor is provided to detect the temperature of gas. If it is determined that the temperature of gas within the combustion chamber fail to match a target temperature level, the open time of the intake valve is adjusted to maintain the gas temperature as high as the target temperature level At the target temperature level, the air/fuel mixture starts auto-ignition if spark is produced by a spark plug.

JP-A 7-4287 discloses a control system for a diesel engine. According to this control system, oxygen density of intake charge drops due to exhaust gas recirculation (EGR) to lower burning temperature. Injection timing of fuel is adjusted to a crank position after top dead center of compression stroke to provide increased ignition delay when oxygen density of intake charge drops. This control is effective in auto-ignition combustion of fuel with high cetane number, with low emission of NOx and smoke.

Prior art techniques according to JP-A 10-196424 and JP-A 11-210539 are satisfactory to some extent in controlling beginning of burning. However, there is a limit to increasing load request because burning velocity increases rapidly to bring about a rapid increase in cylinder pressure during operation with high load, resulting in unacceptably high level of vibration and noise. Besides, there is a limit to increasing engine speed because combustion is not completed within one cycle at high engine speeds, resulting in high emission of unburned gas.

The control strategy according to JP-A 7-4287 has proven to be effective in holding conditions for stable auto-ignition combustion of fuel with high cetane number. However, applying this control strategy to a gasoline internal combustion engine does not provide satisfactory auto-ignition combustion of gasoline fuel. This is because conditions for auto-ignition combustion of gasoline fuel are considerably narrower than those for auto-ignition combustion of diesel fuel.

SUMMARY OF THE INVENTION

An object of the present invention is to accomplish stable auto-ignition combustion of gasoline fuel in an internal combustion engine over extended operating conditions with low fuel consumption and good drivability.

In one aspect of the present invention, the above object is achieved by a system for auto-ignition combustion management in an internal combustion engine having at least one cylinder, and a piston reciprocating in the cylinder, the system comprising:

an actuator to vary at least one of controlled parameters governing burning timing in the cylinder; and a controller for varying the burning timing via said actuator such that main combustion timing retards as load request on the engine becomes high during operation within an auto-ignition combustion range.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

BEST MODES FOR CARRYING OUT THE INVENTION

Figure 1:
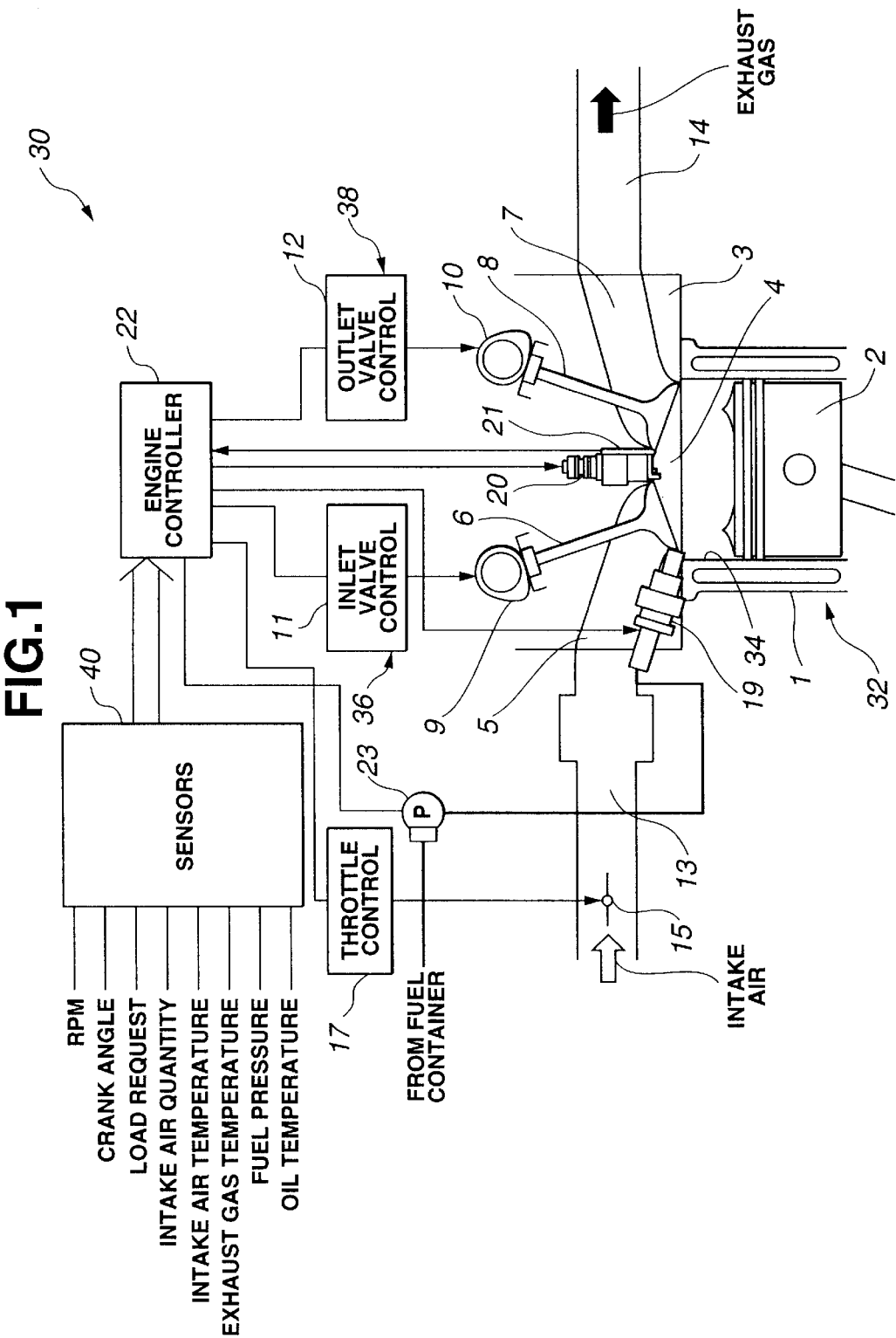
FIG. 1 is a block diagram illustrating a system or method for auto-ignition combustion management in an internal combustion engine according to the present invention.

FIG. 1 provides a block diagram of a system or method for auto-ignition of gasoline fuel in an internal combustion engine. System 30 includes an internal combustion engine, indicated generally by reference numeral 32, in communication with an engine controller 22.

In FIG. 1, the area of a combustion chamber of engine 32 is shown. Engine 32 has a cylinder block 1 and a cylinder head 3. Cylinder block 1 has at least one cylinder 34 with a piston 2 reciprocating therein to define a combustion chamber 4 in cooperation with cylinder head 3. Combustion chamber 4 is shown communicating within an intake conduit 13 and an exhaust conduit 14 via intake and exhaust ports 5 and 7 in a known manner.

Figure 2:
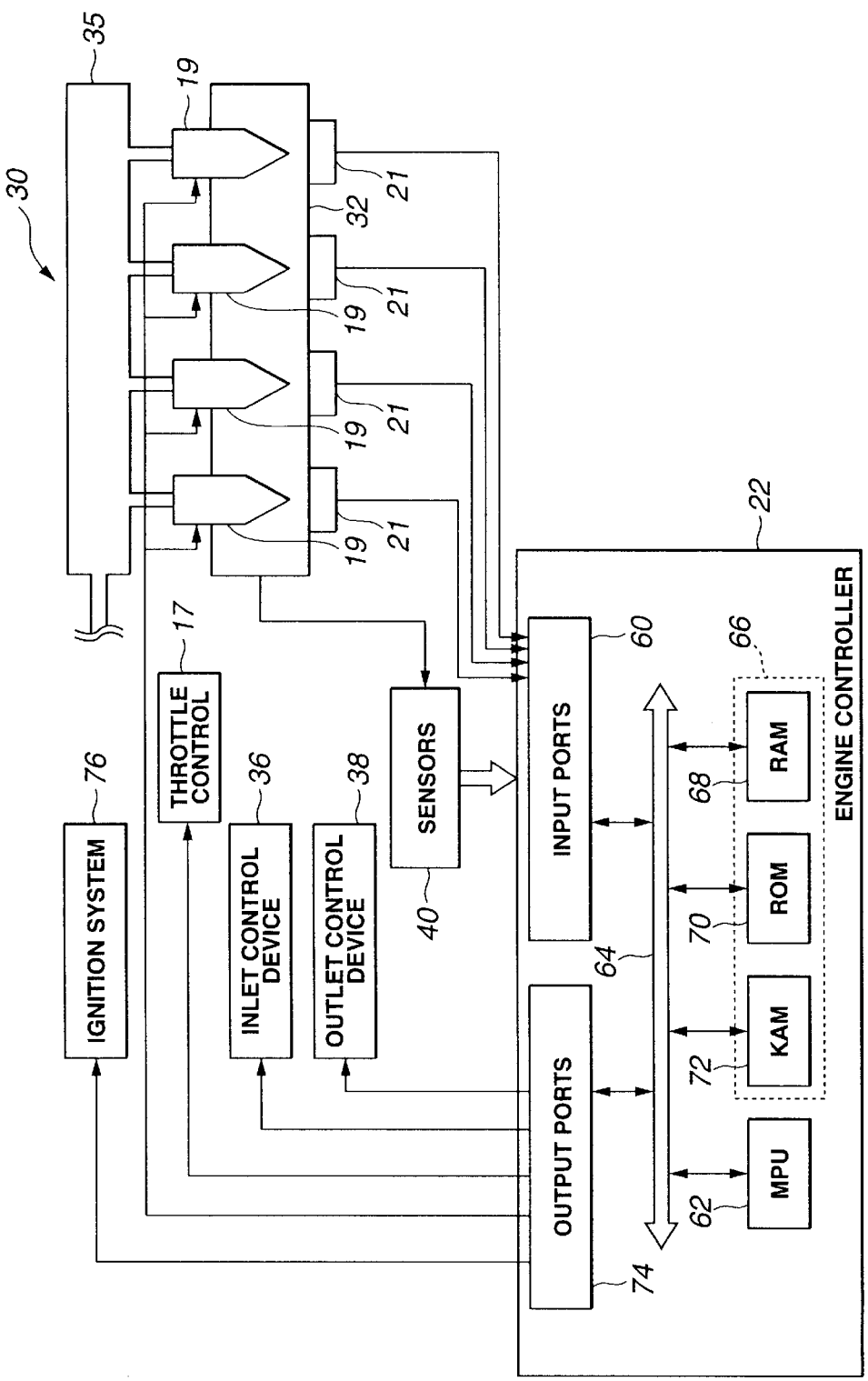
FIG. 2 is a block diagram illustrating engine controller according to the present invention.

Referring also to FIG. 2, engine 32 is an internal combustion engine, such as a four, six or eight-cylinder gasoline engine. Fuel injectors 19 are shown receiving pressurized fuel from a supply 35 that is connected to a high-pressure pump 23 as shown in FIG. 1. Alternatively, embodiments of the present invention may employ a plurality of unit pumps (not shown), each supplying fuel to one of the injectors 19.

As shown in FIG. 1, each injector 19 is shown directly communicating with one of combustion chambers for direct injection of fuel. A throttle 15 is provided to regulate intake air to be admitted into intake conduit 13 Throttle 15 is activated by a throttle control 17. Throttle control 17 may include an electronically or electro-magnetically controlled actuator or motor. A spark plug 20 of an ignition system 76 (see FIG. 2) is shown directly communicating with combustion chamber 4 to provide spark.

An inlet control device, generally indicated at 36, controls flow into combustion chamber 4. An outlet control device, generally indicated at 38, controls flow from combustion chamber 4. In a preferred embodiment, inlet control device 36 includes at least one cam 9 driven intake valve 6 actuated by valve controller 11, and outlet control device 38 includes at least one cam 10 driven exhaust valve 8 actuated by valve controller 12. However, as one skilled in the art would recognize, there are many alternative embodiments.

System 30 may also include various sensors 40 for generating signals indicative of corresponding operational conditions or parameters of engine 32. Sensors 40 are in electrical communication with controller 22 via input ports 60, which may provide signal conditioning, conversion, and/or fault detection, as well known in the art.

The operational conditions or parameters of engine 32 may include engine speed (RPM), crank angle (θ), load request, intake air quantity, intake air temperature, exhaust gas temperature, fuel pressure and oil temperature. Counting the number of pulses from a crank angle sensor (not shown) may be used to determine the engine speed, and an accelerator pedal opening may indicate the load request, as is well known in the art.

A plurality of cylinder pressure sensors 21 is shown, each cylinder pressure sensor detecting cylinder pressure in one of combustion chambers 4. Pressure sensors 21 are in electrical communication with controller 22 via input ports 60. Alternatively, embodiments of the present invention may employ one or more cylinder pressure sensors less, in number, than the cylinders. In such cases, one or more cylinders are selected out of all for detection of cylinder pressure. Each cylinder pressure sensor 21 may be an integral part of the associated one of spark plugs 20. Alternatively, cylinder pressure may be detected without resorting to cylinder pressure sensor 21 by measuring stress applied to a washer interposed between one of spark plugs 20 and cylinder head 3.

With reference to FIG. 2, controller 22 receives signals from the various sensors 40 and cylinder pressure sensors 21 via input ports 60. Input ports 60 communicate with processor 62 via a data/control bus 64. Processor 62 implements control logic in the form of hardware and/or software instructions, which may be stored in computer readable storage medium 66, to effect control of engine 32. Computer readable storage medium 66 may include various types of volatile or nonvolatile memory such as random-access memory (RAM) 68, read-only memory (ROM) 70, and keep-alive memory (KAM) 72. These "functional" classifications of memory may be implemented by one or more different physical devices such as PROMs, EPROMs, EEPROMs, flash memory, and the like, depending upon the particular application.

In one embodiment, processor 62 executes instructions stored in computer readable storage medium 66 to carry out the method for auto-ignition combustion management to communicate with various actuators of engine 32 via output ports 74. Actuators may control ignition timing or spark 76, fuel injection timing and fuel quantity for injection by fuel injectors 21, throttle position 17, valve timing of inlet control device 36, and valve timing of outlet control device 38.

Characteristic engine diagrams for auto-ignition combustion mode and spark-ignition combustion mode are stored in controller 22 in the form of valve timings of inlet and outlet control devices 36 and 38.

Figure 3:
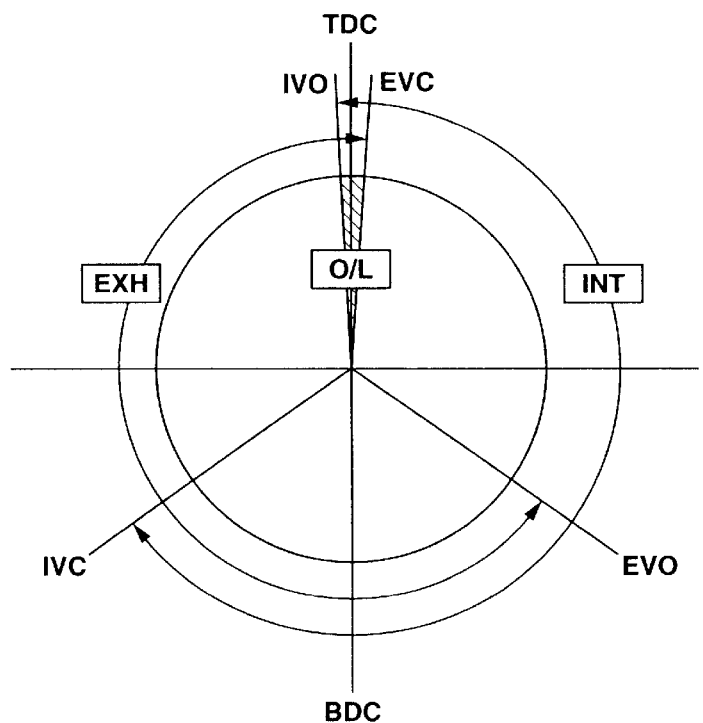
FIG. 3 is a valve-timing diagram illustrating a representative example of valve timings of inlet and outlet control devices (intake and exhaust valves) for spark-ignition combustion mode.

FIG. 3 provides a valve timing diagram illustrating a representative example of valve timings of inlet and outlet control devices 36 and 38 (intake and exhaust valves 6 and 8) for spark-ignition combustion mode at full or near full load. In spark-ignition combustion mode, controller 22 transmits timings to outlet and inlet control devices 38 and 36 to provide optimum valve overlap duration around top dead center (TDC) of exhaust stroke of piston 2.

Figure 4:
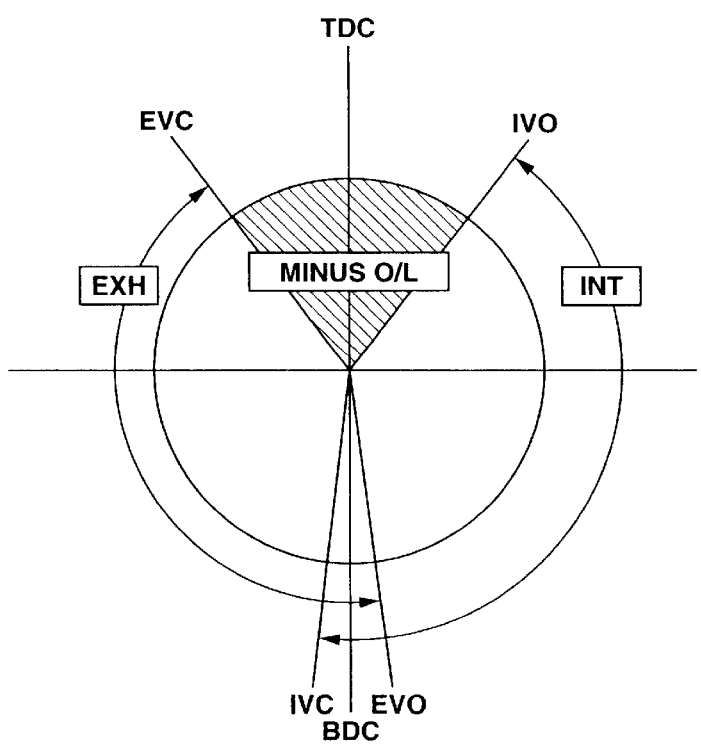
FIG. 4 is a valve-timing diagram illustrating valve timings of inlet and outlet control devices (intake and exhaust valves) for auto-ignition combustion mode

FIG. 4 provides a valve timing diagram illustrating valve timings of inlet and outlet control devices 36 and 38 (intake and exhaust valves 6 and 8) for auto-ignition combustion mode. To provide appropriate temperature condition for auto-ignition, exhaust valve 8 of outlet control device 38 is allowed to close before piston 2 reaches TDC of exhaust stroke, so that high temperature exhaust gas is retained and compressed in cylinder 34 during the last travel section of exhaust stroke. Intake valve 6 of inlet control device 36 is opened after the TDC of exhaust stroke. Setting of opening timing is such that inlet control device 36 is allowed to open after almost all of work done by piston 2 to compress the retained gas has been transferred to energy to move piston 2 in downward direction from the TDC position. Exhaust gas is retained and compressed in cylinder 34 because both outlet and inlet control devices 38 and 36 are closed. Compression of the retained exhaust gas causes an increase in cylinder temperature, which provides advantageous influence on auto-ignition at around top dead center (TDC) of the subsequent compression stroke. In each of FIGS. 3 and 4, various abbreviations are used. INT represents an intake valve, IVO represents intake valve opens, IVC represents intake valve closes, EXH represents an exhaust valve, EVO represents exhaust valve opens, and EVC represents exhaust valve closes. O/L represents an overlap between INT and EXH. Minus O/L represents a minus overlap when both EXH and INT close. Provision of such minus O/L around TDC of exhaust stroke is intended to retain exhaust.

Adjusting the rotational phase of a camshaft or a cam-driving shaft relative to a crankshaft of an engine is a well-known technique to vary opening and closing timings of a gas exchange valve. Examples of valve controllers employing such technique are shown in U.S. Pat. No. 5,669,343 (Adachi), U.S. Pat. No. 5,836,276 (Iwasaki et al.), and JP-A P2000-73797A. Also known is a technique to adjust the rotational phase of a pivotal cam relative to a crankshaft of an engine. According to this known technique, the valve open duration and valve lift are varied. Examples of valve controllers employing this known technique are shown in U.S. Pat. No. 4,397,270 (Aoyama), Ronald S. Pierik and Burak A. Gecim "A Low-Friction Variable-Valve-Actuation Device, Part 1: Mechanism Description and Friction Measurements" SAE Paper 970338, 1997, U.S. Pat. No. 5,988,125 (Hara et al.), and JP-A 11-294125. It is also known to electromagentically operate a gas exchange valve. A valve controller employing this technique is shown in U.S. Pat. No. 5,785,016 (Enderle et al.).

Any one of the above listed valve controllers may be used in inlet and outlet control devices 36 and 38.

As mentioned before, for auto-ignition combustion mode, inlet and outlet control devices 36 and 38 are so adjusted as to retain exhaust gas from the previous cycle. Varying closing timing of outlet control device 38 may vary the quantity of exhaust gas retained during exhaust gas retaining duration. Varying the quantity of the retained exhaust gas work in adjusting temperature of cylinder charge at round TDC of compression stroke. For further information on how to vary exhaust gas retaining duration, reference should be made to the commonly assigned pending U.S. Patent Application Serial No. unassigned yet, entitled "AUTO-IGNITION OF GASOILINE ENGINE BY VARYING EXHAUST GAS RETAINING DURATION", which claims priority of Japanese Patent Application No. 2000-095500 filed Mar. 30, 2000.

If need arises in adjusting intake air to keep cylinder charge high, exhaust gas supplied from an exhaust gas recirculation (EGR) conduit, not shown, may be used.

Figure 5:
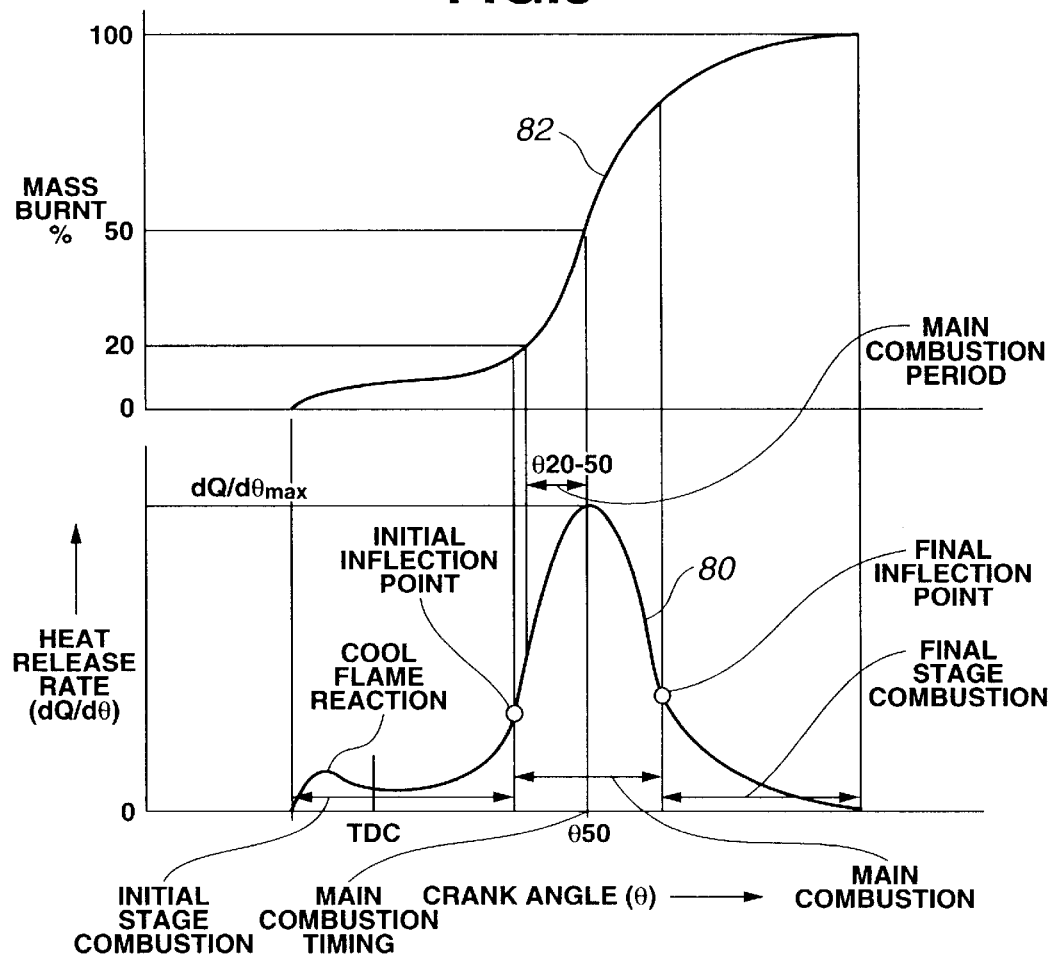
FIG. 5 shows a heat release rate curve and a mass burnt curve of a representative pattern of auto-ignition combustion event of gasoline fuel, illustrating a main combustion timing (θ50) and a main combustion period (θ20-50), which quantify burning characteristic of auto-ignition combustion event, according to the present invention.

In the preferred embodiment, controller 22 carries out auto-ignition combustion management by appropriately adjusting a main combustion timing and a main combustion period, both of which terms are illustrated in FIG. 5.

FIG. 5 shows a heat release rate curve 80 and a mass burnt rate curve 82 of a representative pattern of auto-ignition combustion event of gasoline fuel. Heat release rate is expressed by $dQ/d\theta$, where Q represents heat expressed in terms of calorie, and $\theta$ represents crank angle. Heat release rate curve 80 results from interconnecting heat release rate at each of crank angle. Mass burnt rate is a part of total heat released due to burning of a whole quantity of fuel. Mass burnt rate curve 82 results from interconnecting mass burnt rate at each of crank angles.

Heat release rate curve 80 clearly shows that a whole combustion event may be dividable into initial stage combustion, main combustion, and final stage combustion. The initial stage combustion where cool flame reaction occurs begins with ignition of a relatively rich part of a whole stratified charge. Burning of this relatively rich part causes auto-ignition to take place within a relatively lean remaining part of the whole charge, initiating the main combustion where thermal flame reaction occurs. The main combustion is followed by the final stage combustion where dull burning occurs due to piston downward movement.

The main combustion is herein used to mean a part of the whole combustion event, which part begins at a crank position when the heat release rate curve 80 passes a first inflection point, namely, an initial inflection point, after having exceeded a predetermined level of heat release rate, not shown, and ends at a crank position when the heat release rate curve 80 passes a second inflection point, namely, a final inflection point, after having accomplished the maximum heat release rate $dQ/d\theta max$.

Inventors have found that burning characteristic of auto-ignition combustion event may be quantified by two values, namely, a main combustion timing and a main combustion period, which represent the main combustion as illustrated in FIG. 5. They confirmed that these two values govern level of stability and level of intensity of noise due to auto-ignition combustion in internal combustion engine.

The main combustion timing may be defined as timing or crank position when any one of values, each of which is considered to indicate burning characteristic of auto-ignition combustion. Timing at which the maximum heat release rate $dQ/d\theta max$ occurs may define the main combustion timing. Timing at which mass burnt rate reaches 50% may define the main combustion timing. Timing at which the maximum pressure rate $dP/d\theta max$, where P represents cylinder pressure, occurs may define the main combustion timing. Among the three alternatives of the main combustion timing, a difference between the timing when $dQ/d\theta max$ occurs and the timing when mass burnt rate reaches 50% is small and negligible. The timing when $dP/d\theta max$ occurs is slightly earlier than the other two or advanced as compared to them. Hereinafter, the main combustion timing is labeled θ50. Of course, this labeling does not mean that the main combustion timing is limited to timing when the mass burnt rate reaches 50%. With this labeling, the main combustion timing is contemplated. to mean also timing when $dQ/d\theta max$ occurs or timing when $dP/d\theta max$ occurs.

Flatly speaking, the main combustion period may be defined as a part of duration of a whole combustion event, during which part the initial stage and final stage combustions have little influence. Practically, beginning of the main combustion period may be determined, with good accuracy, by timing corresponding to occurrence of a heat value, which is higher than a heat value due to cool flame reaction and a heat value required to cause initiation of auto-ignition of the relatively lean part of stratified charge. Ending of the main combustion period may be determined, with good accuracy, by the main combustion timing θ50. In the preferred embodiment, the main combustion timing is the timing when mass burnt rate reaches 50%. In the preferred embodiment, the main combustion period is defined by a period from timing (a crank position) when mass burnt rate reaches 20% to timing (a crank position) when mass burnt rate reaches 50%. Hereinafter, the main combustion period is labeled θ20-50. Of course, this labeling does not mean that the main combustion period is limited a period from timing with mass burnt rate 20% to timing with mass burnt rate 50%. With this labeling, the main combustion period is contemplated to mean also a period ending with timing when dQ/dθmax occurs or timing when dP/dθmax occurs. In this case, beginning of the main combustion period may be determined by timing corresponding to occurrence of a heat value, which is higher than a heat value due to cool flame reaction and a heat value required to cause initiation of auto-ignition of the relatively lean part of stratified charge.

Figure 6:
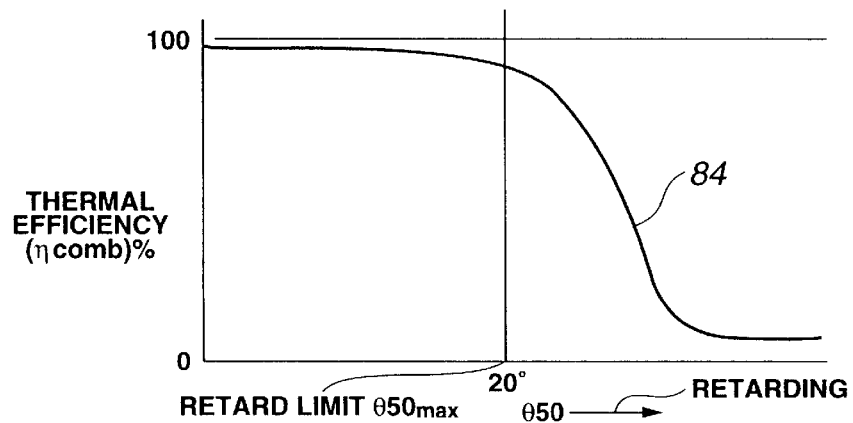
FIG. 6 is a graphical representation of a relationship between main combustion timing (θ50) and thermal efficiency, illustrating a retard limit (θ50 max) to retarding the main combustion timing.

Referring now to FIG. 6, a relationship between the main combustion timing θ50 and thermal efficiency of auto-ignition combustion will be described. In FIG. 6, the horizontal axis represents crank angles after TDC of compression stroke, and the vertical axis represents thermal efficiency in percentage. As pistons increases its speed during downward movement from TDC of compression stroke, temperature and pressure conditions within cylinder become too poor to sustain progress of oxidation reaction of fuel that remains for the final stage combustion. Thermal efficiency curve 84 clearly shows that thermal efficiency is as high as or near 100% when main combustion timing θ50 is at a crank position retarded not greater than a predetermined crank angle. When main combustion timing θ50 is at a crank position greater than the predetermined crank angle, thermal efficiency drops considerably below 100%. Thus, there is a retard limit 50max to retarding θ50.

Burning velocity has influence on thermal efficiency. However, burning velocity of auto-ignition combustion is difficult to vary. Thus, in auto-ignition combustion, main combustion timing θ50 governs thermal efficiency.

With main combustion timing θ50 held at retard limit θ50max that is appropriate at low engine speeds, auto-ignition combustion would not be completed before establishment of poor temperature and pressure conditions for oxidation reaction of fuel by descending of piston 2 at high engine speeds. Setting of retard limit θ50max must be made taking into account of the influence due to variation of engine speed. Retard limit θ50max may take different crank angles after TDC such that it advances toward the TDC as engine speed increases. In this case, retard limit θ50max takes the most retarded crank angle during operation in the neighborhood of the lowest engine speed limit within auto-ignition combustion range. Alternatively, retard limit θ50max may take a single crank angle after TDC over all engine speed increases within auto-ignition combustion range. In this case, retard limit θ50max is 20 degrees after TDC of compression stroke (20° ATDC) for auto-ignition of gasoline.

With the same engine speed and load, cooling loss and time-varying loss determine the best main combustion timing for the best thermal efficiency. This best main combustion timing is subject to variation corresponding to varying engine speed and load.

Accordingly, preferred setting is such that main combustion timing θ50 is on the advance side of retard limit θ50max and takes a crank angle for providing the best thermal efficiency under given engine speed and load conditions.

Figure 7:
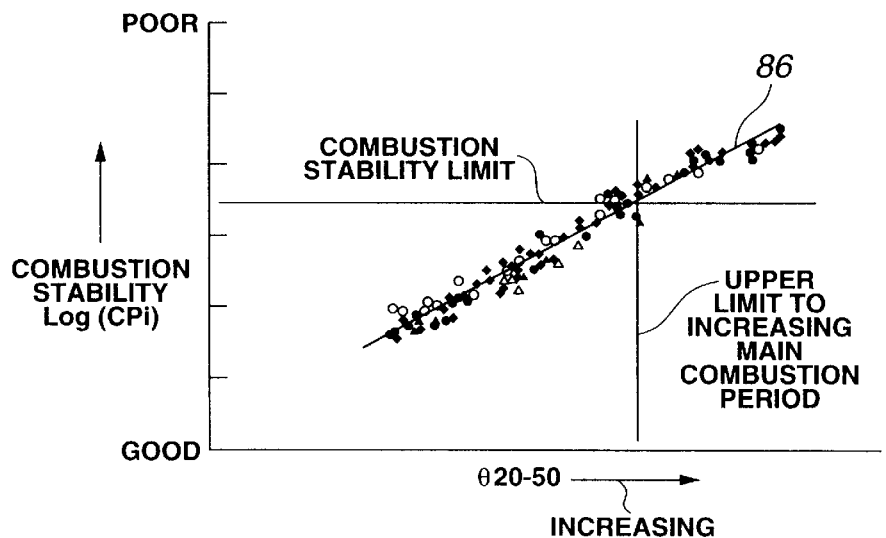
FIG. 7 is a graphical representation of a relationship between main combustion period (θ20-50) and combustion stability, illustrating an upper limit to increasing main combustion period (θ20-50 max).

Referring next to FIG. 7, a relationship between the main combustion timing θ20-50 and combustion stability of auto-ignition combustion will be described. In FIG. 7, the horizontal axis represents length of main combustion period θ20-50, and the vertical axis represents combustion stability.

In the preferred embodiment, combustion stability Cpi can be expressed as:

$$CPi = \sigma Pi/(\text{the mean } Pi) \qquad (1),$$

where:
  σPi represents standard deviation of indicated mean effective pressure Pi,
  the mean Pi represents cycle mean value of indicated mean effective pressure Pi.

After conductive a great number of experiments, the inventors have found that main combustion period θ20-50 is deeply correlative to combustion stability CPi. In FIG. 7, a logarithm of values of CPi against values of θ20-50 obtained through experiments are plotted. As is readily seen from a line 86 drawn reflecting tendency of distribution of the plotted values, Log(CPi) may be expressed as a first order function of θ20-50, indicating that combustion stability CPi becomes worse rapidly as main combustion period θ20-50 becomes long. This correlation holds irrespective of variation of engine speed and θ50 during operation within auto-ignition combustion range as long as θ50 stays on advance side of retard limit θ50max. Combustion stability limit is reached when level of vehicle vibration exceeds an acceptable level Within load range of auto-ignition combustion, comparison of level of vehicle vibration due to auto-ignition combustion with the acceptable level is used to determine an upper limit to increasing main combustion period θ20-50max. Considering level of vehicle vibration, the preferred setting is such that upper limit θ20-50max is not greater than 7 degrees in crank angle. The variable CPi may be used to evaluate the quality of burning of auto-ignition combustion. However, rather than the variable CPi, the variable σCPi of the equation (1) is deeply correlative to level of vehicle vibration. Accordingly, the preferred setting is such that the upper limit θ20-50max becomes short as load request increases. In other words, the upper limit θ20-50max is load dependent.

The inventors have also found that main combustion timing θ50 and main combustion period θ20-50 are main causes that govern occurrence of noise or knock derived from auto-ignition combustion. They also have found that the maximum value of rate of change, with respect to time, of cylinder pressure dP/dtmax is deeply correlative to occurrence of noise or knock derived from auto-ignition combustion, and dP/dtmax can be expressed using operational variables at θ50 and θ20-50 as:

$$dP/dt\text{max} = (C1 \cdot Ne \cdot dQ/d\theta \text{ max})/V50 - C2 Ne \cdot T50 \cdot (dV/d\theta)50 \qquad (2),$$

$$dQ/d\theta \text{ max} = (C3 = Q\text{fuel} \cdot \eta\text{comb})/\theta 20\text{-}50 \qquad (3),$$

where:
  C1, C2, and C3 represent values, respectively, which are determined by composition of fuel and density of air/fuel mixture,
  Ne represents engine speed,
  V50 represents volume of combustion chamber at θ50,
  T50 represents the mean temperature within combustion chamber at θ50,
  (dV/dθ)50 represents the rate of change, with respect to crank angle, of volume of combustion chamber at θ50,
  Qfuel represents quantity of fuel supplied to combustion chamber, and
  ηcomb represents thermal efficiency.

The equation (3) clearly indicates that a drop in the term dQ/dθ max and an increase in the term (dV/dθ)50 are effective in lowering dP/dtmax. This means that slow burn at delayed crank angle is effective to lower dP/dtmax. The equation (2) also indicates that it is necessary to increase the amount of drop in dQ/dθ max and the amount of increase in (dV/dθ)50 corresponding to an increase in engine speed Ne.

The equation (3) clearly indicates that dQ/dθ max is proportional to quantity of fuel Qfuel and inverse proportional to main combustion period θ20-50.

Accordingly, in the preferred embodiment, main combustion period θ20-50 is prolonged to cope with an increase in load, i.e., an increase in Qfuel, to keep dQ/dθ max almost the same.

Once engine speed Ne and quantity of fuel (load) Qfuel are determined, a lower limit to decreasing main combustion period θ20-50 can be determined using equations (2) and (3).

Figure 8:
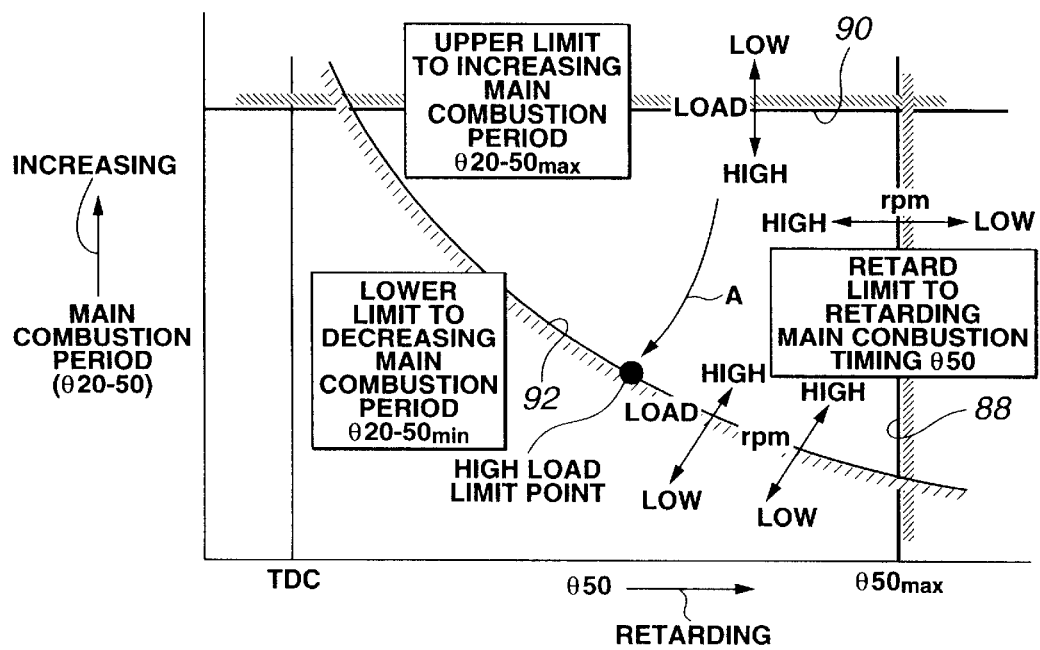
FIG. 8 is a graphical representation of a range within which main combustion period (θ20-50) and main combustion timing (θ50) may find their appropriate values to provide satisfactory levels of fuel economy, combustion stability, noise and knock derived from auto-ignition combustion.

The correlation between main combustion timing θ50 and main combustion period is illustrated in FIG. 8. In FIG. 8, the horizontal axis represents main combustion timing θ50 in terms of crank angle after TDC of compression stroke, while the vertical axis represents main combustion period θ20-50 in terms of crank angles. Vertical line 88 represents retard limit θ50 that has been discussed with reference to FIG. 6. Viewing in FIG. 8, line 88 moves to the right or in a retard direction in crank angle as engine speed (rpm) becomes low or to the left or in an advance direction in crank angle as engine speed becomes high. Horizontal line 90 represents upper limit θ20-50max that has been discussed with reference to FIG. 7. Viewing in FIG. 8, horizontal line 90 moves upwardly or in a direction to lift the maximum of main combustion period θ20-50 as load request becomes low or downwardly or in a direction to down the maximum of main combustion period θ20-50 as load request becomes high.

Curve 92 represents operation points during operation at one of engine speeds with one of values of load request, each point representing a value of lower limit θ20-50min against one of values of advance limit to advancing main combustion timing θ50. Each of operation points on curve 92 moves in a direction to move the advance limit to main combustion timing θ50 away from vertical line 88 toward TDC and to move the lower limit θ20-50min to main combustion period θ20-50 away from horizontal line 90 as engine speed (rpm) becomes low with load request unaltered. Each of such operation points moves in a direction to move the advance limit to main combustion timing θ50 toward vertical line 88 and to move the lower limit θ20-50min toward horizontal line 90 as engine speed becomes high with load request unaltered. Each operation point on curve 92 moves in a direction to move the advance limit to main combustion timing θ50 away from vertical line 88 toward TDC and to move the lower limit θ20-50min away from horizontal line 90 as load request becomes low with engine speed unaltered. Each operation point on curve 92 moves in a direction to move the advance limit to main combustion timing θ50 toward vertical line 88 and to move the lower limit θ20-50min toward horizontal line 90 as load request becomes high with engine speed unaltered.

In FIG. 8, vertical line 88, horizontal line 90 and curve 92 define limits of a range within which main combustion period θ20-50 and main combustion timing θ50 may find their appropriate values to provide satisfactory levels of fuel economy, combustion stability, noise and knock derived from auto-ignition combustion.

In the preferred embodiment, main combustion period θ20-50 may lie between horizontal line 90 and one of operation points on curve 92 corresponding to a given value of main combustion timing θ50. Main combustion timing θ50 may lie between vertical line 88 and one of operation points on curve 92 corresponding to a given value of main combustion period θ20-50.

As mentioned before, as engine speed becomes high and load request becomes high, each of operation points on curve 92 moves in a direction to reduce distance from vertical line 88 and distance from horizontal line 90, narrowing the range defined by lines 88, 90, and curve 92.

In the neighborhood of high load limit of auto-ignition combustion range, the advance limit to main combustion timing approaches vertical line 88 representing retard limit θ50max, narrowing a range within which main combustion timing θ50 may lie. In the preferred embodiment, if this range become unavailable for load request, there is a shift from auto-ignition combustion to spark-ignition combustion.

In FIG. 8, a curved arrow A shows trail how main combustion timing θ50 and main combustion period θ20-50 change if quantity of fuel supplied to combustion chamber is increased with throttle position and valve timings unaltered. Increasing quantity of fuel in this manner causes a rapid advance in main combustion timing θ50 as well as a rapid decrease in main combustion period θ20-50, reaching high load limit point designated by a black dot on curve 92 after leaving the trail shown by arrow A.

In the preferred embodiment, at least in the neighborhood of high load limit of auto-ignition combustion range, main combustion timing θ50 moves in a retard direction as load request becomes high. If beginning of burning is delayed to provide a desired retarded main combustion timing θ50, main combustion period θ20-50 tends to increase. With reference to FIG. 8, horizontal line 90 representing upper limit θ20-50max moves down as load request becomes high. To cope with this situation, according to the preferred embodiment, main combustion period θ20-50 is maintained or decreased as load request becomes high.

In the preferred embodiment, target values of main combustion timing θ50, and target values of main combustion period θ20-50 are determined in compliance with control rules described with reference to FIGS. 6–8.

Figure 9:
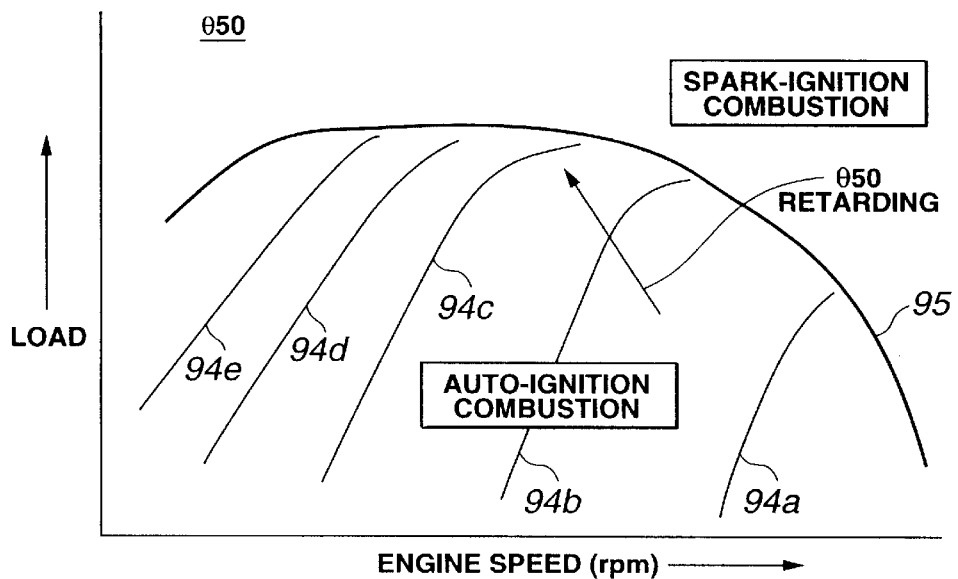
FIG. 9 is an engine map showing target values of main combustion timing (θ50) against varying values of engine speed and load request.

FIG. 9 is an engine map illustrating a plurality of lines 94a, 94b, 94c, 94d, and 94e, each drawn through all operation points where main combustion timing θ50 has the same target value. All of the lines 94a, 94b, 94c, 94d, and 94e end at different points, respectively, on a bold line drawn curve 95. Curve 95 defines periphery of auto-ignition combustion range and separates it from spark-ignition combustion range. Target value increases as operation point crosses lines 94a, 94b, 94c, 94d, and 94e in this order, causing main combustion timing θ50 to shift in retard direction. All points through which bold line 96 is drawn have target values, each indicating retard limit θ50 for the corresponding engine speed. This retard limit θ50max corresponds almost to the retard limit θ50max described with reference to FIGS. 6 and 8, but differs slightly from the latter in that the former is subject to variation corresponding to load.

Figure 10:
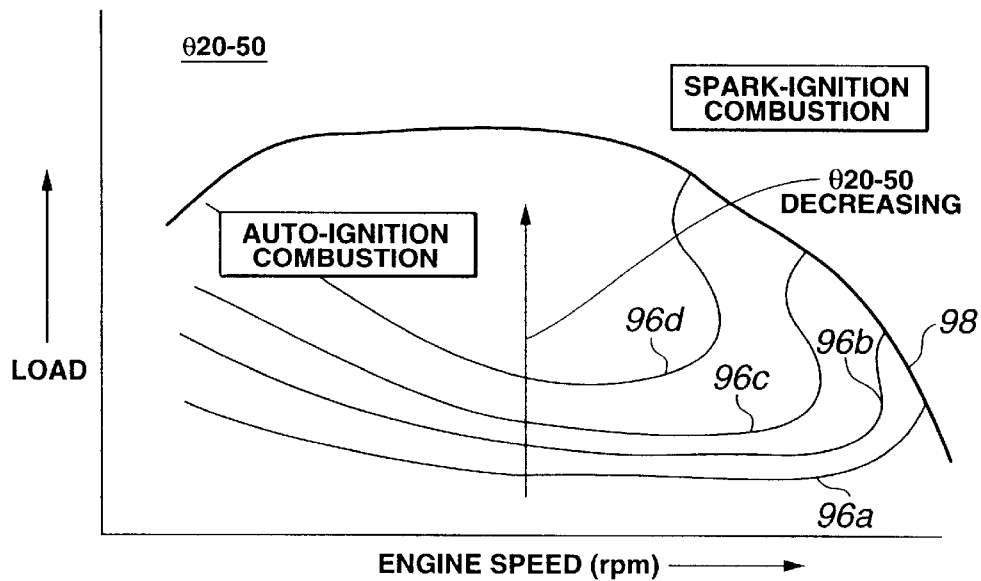
FIG. 10 is an engine map showing target values of main combustion period (θ20-50) against varying values of engine speed and load request.

FIG. 10 is an engine map illustrating a plurality of lines 96a, 96b, 96c, and 96d, each drawn through all operation points where main combustion period θ20-50 has the same target value. All of the lines 96a, 96b, 96c, and 96d begin at different points, respectively, on a bold line drawn curve 98 at low speeds, and end at different points, respectively, on the bold line 98 at high speeds. Curve 98 defines periphery of auto-ignition combustion range and separates it from spark-ignition combustion range. Target value decreases as operation point crosses lines 96a, 96b, 96c, and 96d in this order, causing main combustion period θ20-50 to decrease. All points through which bold line 98 is drawn have target values, each indicating upper limit θ20-50max to increasing main combustion period. This upper limit θ20-50max corresponds almost to the upper limit θ20-50max described with reference to FIGS. 7 and 8, but differs slightly from the latter in that the former is subject to variation corresponding to engine speed. The setting of target values is such that, in the neighborhood of high load limit of auto-ignition combustion range, main combustion period θ20-50 will not prolong against a retard of main combustion timing θ50 to maintain combustion stability, and, at low speeds of auto-ignition combustion range, main combustion period θ20-50 prolong to enhance thermal efficiency. For the other part except the high load limit part and the low speed part of auto-ignition combustion, setting of target values is free as long as they fall in the range described in connection with FIG. 8.

Figure 11:
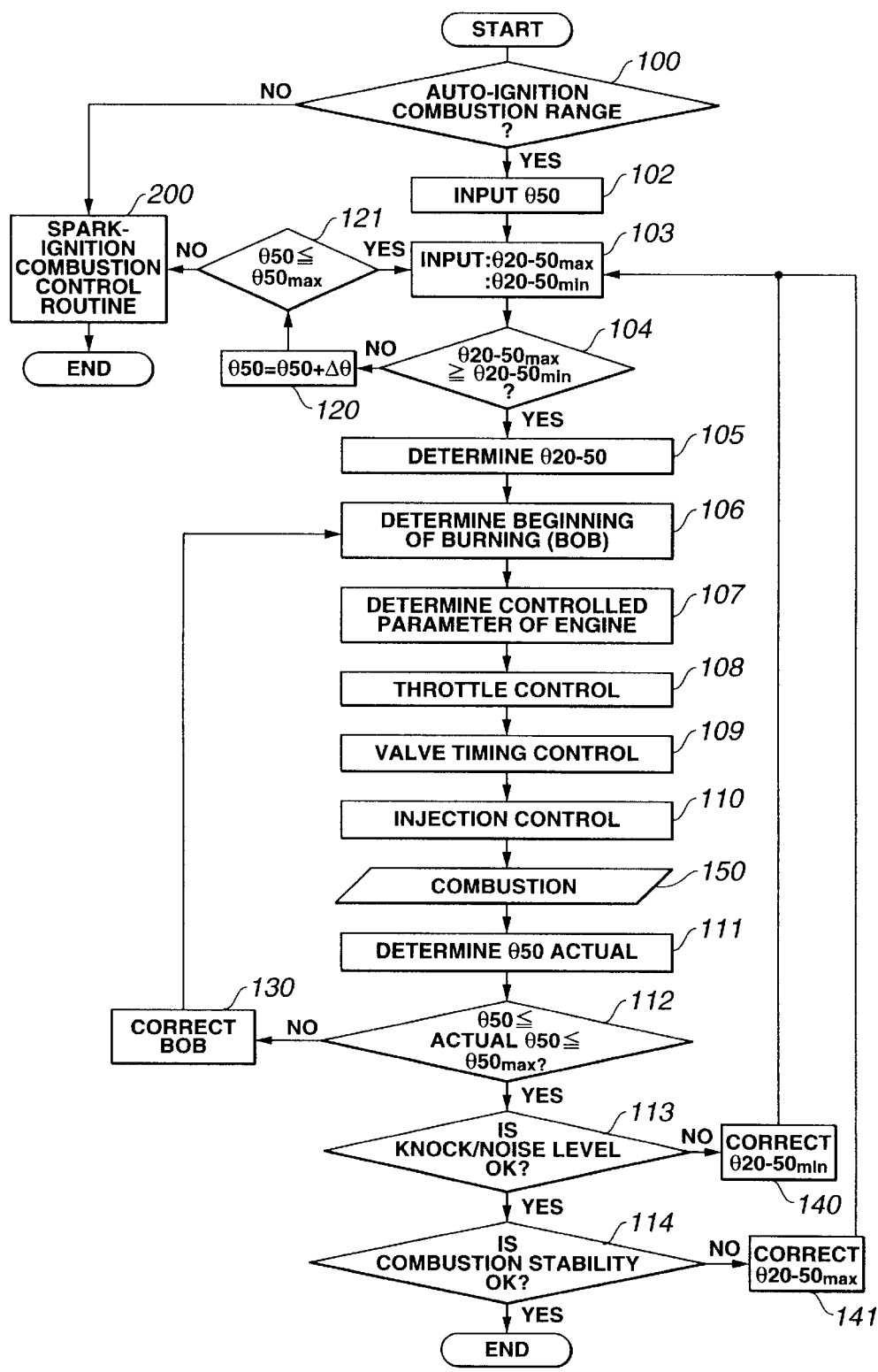
FIG. 11 is a flow chart for a controller routine for operating the preferred implementation of the present invention.

The flow chart of FIG. 11 is a controller routine for operating the preferred implementation of the present.

In FIG. 11, at step 100, controller 22 determines based on engine speed, load request and engine warm-up whether or not current operation point falls in auto-ignition combustion range. If this is not the case so that the current operation point fails to fall in auto-ignition combustion range, control goes to step 200. At step 200, controller 22 carries out spark-ignition combustion control routine.

If, at step 100, it is determined that current operation point falls in auto-ignition combustion range, control goes to step 102. At step 102, controller 22 performs a table look-up operation of map shown in FIG. 9, which is stored in ROM 77, using current values of engine speed and load request to input a target value of main combustion timing θ50. At the next step 103, controller 22 performs a table look-up operation of a map containing data as described in connection with bold curve 98 in FIG. 10 using current values of engine speed and load request to input an appropriate value of upper limit θ20-50max. At step 103, it also performs a table look-up operation of a map containing data as described in connection with curve 92 in FIG. 8 using current values of engine speed and load request to input an appropriate value of lower limit θ20-50min. These maps are stored in ROM 70.

At the next interrogation step 104, controller 22 determines whether or not θ20-50max is greater than or equal to θ20-50min. If this is not the case, i.e., θ20-50max<θ20-50min, control goes to step 120. This is the case where there is no range in which main combustion period θ20-50 may lie. At step 120, controller 22 carries out increment of the value of θ50 by a Δθ to retard θ50. Δθ can be expressed as a difference resulting from subtraction of θ20-5omax from θ20-50min. Control goes from step 120 to interrogation step 121. At step 121, controller 22 determines whether or not θ50 is less than or equal to retard limit θ50max. Although, not shown, in this flow chart, controller 22 has input retard limit θ50max by performing a table look-up operation of a map containing data as described in connection with curve 95 in FIG. 9 using current values of engine speed and load request. If, at step 121, it is determined that θ50 is greater than θ50max, control goes to step 200 where controller 22 carries out spark-ignition combustion control routine. If, at step 121, it is determined that θ50 is less than or equal to θ50max, control goes back to step 103.

If, at step 104, it is determined that θ20-50max≧θ20-50min, control goes to step 105 because there is a range in which main combustion period θ20-50 may lie. At step 105, controller determines a value of θ20-50. Determination of θ20-50 may include a table look-up operation of a map shown in FIG. 10, which is stored in ROM 70, using current values of engine speed and load request to input an appropriate value of θ20-50. This value of θ20-50 is used if it falls in a range between θ20-50max and θ20-50min. If this value of θ20-50 is greater than θ20-50max, the value of θ20-50max is used as θ20-50. It the value of θ20-50 is less than θ20-50min, the value of θ20-50min is used as θ20-50. Control goes from step 105 to step 106.

At step 106, controller 22 determines beginning of burning (BOB) from the determined values of θ50 and θ20-50. This determination may be made by referring to data of BOB against varying values of θ50 and θ20-50.

At the next step 107, controller 22 determines controlled parameter(s) of engine. In the preferred embodiment, BOB control is carried out as follows:

Split injection is carried out. First injection begins at a time falling in duration ranging from intake stroke to first half of the subsequent compression stroke to create widely dispersed air/fuel mixture within combustion chamber 4 for main combustion. Second injection begins at a time falling in the second half of the compression stroke to create a small amount of air/fuel mixture limitedly dispersed in the neighborhood of spark plug 20. Fuel quantity and timing for the first injection and fuel quantity and timing for the second injection are determined so as to create stratified charge of widely dispersed air/fuel mixture for main combustion and limitedly dispersed small amount of air/fuel mixture in the neighborhood of spark plug 20 for ignition to produce propagation of flame to initiate burning of widely dispersed air/fuel mixture.

Controller 22 adjusts timing at which spark is produced by spark plug 20 so that flame propagates to initiate burning of the widely dispersed air/fuel mixture at the BOB determined in step 106.

In the preferred embodiment, controller 22 adjusts ignition timing of ignitable air/fuel mixture dispersed in the neighborhood of spark plug 20 to vary main combustion timing θ50. In other words, spark timing is the primary control factor of main combustion timing θ50.

In the preferred embodiment, temperature and excess air ratio (λ) are controlled to cause auto-ignition to occur within air/fuel mixture for main combustion by heat generated by air/fuel mixture ignition at a desired time. Specifically, controller 22 carries out one of or a combination of at least two of controls as follows:

1) Control of exhaust gas retaining duration by varying minus overlap (see FIG. 4) between outlet and inlet control devices 38 and 36 to vary the amount of exhaust gas retained and the temperature thereof;
2) Throttle control to regulate quantity of intake air; and
3) Timing control for second fuel injection to vary density of fuel within air/fuel mixture for main combustion.

Conditioning of air/fuel mixture for main combustion may be controlled by external EGR or by forced admission of air using super charger.

The state of mixture for main combustion determines a basic length of period of main combustion period θ20-50. In the preferred embodiment, controller 22 controls heat value generated by air/fuel mixture for ignition to vary main combustion period θ20-50. Varying control variables for the second injection may vary the heat value.

Turning back to FIG. 11, controller 22 carries out throttle control at step 108A, valve timing control to vary exhaust gas retaining duration at step 108B, injection control for split injection at step 109, and spark control 110 to create conditions for main combustion with main combustion timing θ50 and main combustion period θ20-50. Auto-ignition combustion takes place at step 150.

Optimization of main combustion timing θ50 is described.

At step 111, controller 22 determines an actual value of main combustion timing θ50 by calculating heat release rate per crank angle based on sensor output from cylinder pressure sensor 21 and crank angle and determining a crank angle when the heat release rate reaches the maximum heat release rate dQ/dθmax. In alternative embodiments, fuel burnt rate is calculated and a crank angle when the fuel burnt rate becomes 50% is determined, or the rate of change of cylinder pressure is calculated and a crank angle after TDC when the rate of change reaches the maximum rate of change dP/dθmax. Cylinder pressure may be detected or determined in other manners. A pressure sensor located between spark plug 20 and cylinder head 3 can detect cylinder pressure. Measuring ion current occurring at spark plug may be used to determine cylinder pressure. Measuring rotational variations of crankshaft per cycle may be used to estimate cylinder pressure by referring to engine motion model.

At the next interrogation step 112, controller 22 determines whether or not the actual value of θ50 falls in a range between the value of θ50 determined at step 102 or 121 and the retard limit θ50max. This range includes the value of eSO determined at step 102 or 121 and the retard limit θ50max. If this is the case, control goes to step 113. If this is not the case, control goes to step 130. At step 130, controller 22 determines amount of correction to be made to BOB in response to the comparison result at interrogation step 112. The determined correction amount is used in determining BOB at step 106. In this manner, main combustion timing θ50 is adjusted to a desired value.

Adaptive control of main combustion period θ20-50 is described.

At step 113, controller 33 detects knock or noise level derived from the combustion and determines whether or not the detected level is below an acceptable level. If this is the case, control goes to step 114. Detection of such level may be made by calculating dP/dtmax from the output of cylinder pressure sensor 21. In alternative embodiment, a regular knock sensor may be used. If, at step 113, the detected knock or noise level exceeds the acceptable level, control goes to step 140.

At step 140, controller 22 increases the length of lower limit θ20-50min. This prolonged θ20-50min is used as input in the process at step 103 in the subsequent cycles. Prolonging θ20-50min is effective to avoid occurrence of knock and noise.

At step 114, controller 22 detects level of combustion stability and determines whether or not the detected combustion stability matches an allowable level. If this is the case, control ends. If, at step 114, the detected combustion stability level fails to match the allowable level, control goes to step 141. Detection of level of combustion stability may be made by calculating indicated means effective pressure Pi to obtain deviation σPi. In alternative embodiment, combustion stability may be detected by detecting variations of engine speed.

At step 141, controller 22 decreases the length of upper limit θ20-50max. This shortened θ20-50max is used as input in the process at step 103 in the subsequent cycles. Shortening θ20-50max is effective to enhance combustion stability.

In alternative embodiment, mass burnt rate and actual value of θ20-50 may be calculated from the output of cylinder pressure sensor, and feedback control to vary this actual value of θ20-50 may be carried out. In the preferred embodiment, the upper and lower limits θ20-50max and θ20-50min are varied to carry out adaptive control without any heavy load on controller 22 due to arithmetic operation.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-179581, filed Jun. 15, 2000, the disclosure of which is hereby incorporated by reference in its entirety.

What is claimed is:

1. A system for auto-ignition combustion management in an internal combustion engine having at least one cylinder, and a piston reciprocating in the cylinder, the system comprising:
   an actuator to vary at least one of controlled parameters governing burning timing in the cylinder; and
   a controller for varying the burning timing via said actuator such that main combustion timing retards as load request on the engine becomes high during operation within an auto-ignition combustion range.

2. The system as claimed in claim 1, wherein the controller causes the main combustion timing to retard as load request on the engine becomes high at least in the neighborhood of high load limit of the auto-ignition combustion range.

3. The system as claimed in claim 1, wherein the controller varies burning speed to bring main combustion period into agreement with a target value.

4. The system as claimed in claim 1, wherein the controller adjusts beginning of burning at least in the neighborhood of high load limit of the auto-ignition combustion range to bring one of main combustion timing and main combustion period into agreement with the corresponding one of desired values.

5. The system as claimed in claim 1, wherein the controller determines a retard limit to retarding the main combustion timing, and causes the main combustion timing to lie on an advanced side of the retard limit.

6. The system as claimed in claim 5, wherein the controller determines the retard limit in response to the engine speed.

7. The system as claimed in claim 6, wherein the controller determines the retard limit such that the retard limit advances as the engine speed becomes high.

8. The system as claimed in claim 5, wherein the controller determines an actual value of the main combustion timing and carries out feedback control to cause the actual value of the main combustion timing to match a target value thereof that lies on the advanced side of the retard limit.

9. The system as claimed in claim 1, wherein the main combustion timing is defined by one of a crank position when maximum heat release rate (dQ/dθ max) is achieved and a crank position after top dead center of compression stroke when maximum rate of change of cylinder pressure (dP/dθ max) is achieved.

10. The system as claimed in claim 9, wherein the controller sets 20 degrees after top dead center of compression stroke as a retard limit to retarding the main combustion timing.

11. The system as claimed in claim 1, wherein the controller determines an upper limit to increasing main combustion period and a lower limit to decreasing the main combustion period.

12. The system as claimed in claim 11, wherein the controller determines the upper limit in response to load request on the engine.

13. The system as claimed in claim 12, wherein the upper limit becomes short as load request becomes high.

14. The system as claimed in claim 11, wherein the controller determines the lower limit in response to at least one of load request on the engine and the engine speed.

15. The system as claimed in claim 14, wherein the lower limit becomes long as one of load request and the engine speed becomes high.

16. The system as claimed in claim 11, wherein the main combustion portion results from subtracting an initial heat release period portion and a final heat release period portion from a total combustion period.

17. The system as claimed in claim 11, wherein the main combustion period is defined as a period beginning with a crank position when mass burnt rate is 20 percent and ending with a crank position when mass burnt rate is 50 percent, and the upper limit has a period falling in a range from 3 degrees in crank angle to 7 degrees in crank angle.

18. The system as claimed in claim 11, wherein the controller corrects the upper limit in response to combustion stability level, and corrects the lower limit in response to at least one of the knock level and noise level.

19. The system as claimed in claim 11, wherein the controller adjusts the main combustion timing on the advance side of the retard limit and adjusts the main combustion period within a range between the upper and lower limits.

20. The system as claimed in claim 19, wherein the controller makes a shift from auto-ignition combustion to spark-ignition combustion when the retard limit and the range between the upper and lower limits are unavailable.

* * * * *